United States Patent
Park et al.

(10) Patent No.: US 12,486,303 B2
(45) Date of Patent: *Dec. 2, 2025

(54) USE OF PEPTIDE FOR INHIBITING FUNCTIONS AND EXPRESSIONS OF MULTIPLE DISEASE BIOMARKERS

(71) Applicant: NIBEC CO., LTD., Chungcheongbuk-do (KR)

(72) Inventors: Yoon Jeong Park, Seoul (KR); Chong-Pyoung Chung, Seoul (KR); Jue-Yeon Lee, Gyeonggi-do (KR)

(73) Assignee: Nibec Co., LTD., Chungcheongbuk-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/385,640

(22) Filed: Oct. 31, 2023

(65) Prior Publication Data
US 2024/0166688 A1      May 23, 2024

Related U.S. Application Data

(62) Division of application No. 17/272,010, filed as application No. PCT/KR2019/011037 on Aug. 29, 2019, now abandoned.

(30) Foreign Application Priority Data

Aug. 31, 2018 (KR) .................. 10-2018-0103615
Aug. 28, 2019 (KR) .................. 10-2019-0105917

(51) Int. Cl.
| C07K 7/00 | (2006.01) |
| A61K 45/06 | (2006.01) |
| C07K 7/08 | (2006.01) |
| A61K 38/00 | (2006.01) |

(52) U.S. Cl.
CPC ............ *C07K 7/08* (2013.01); *A61K 45/06* (2013.01); *A61K 38/00* (2013.01)

(58) Field of Classification Search
CPC .......... C07K 7/08; A61K 45/06; A61K 38/00
See application file for complete search history.

(56) References Cited

U.S. PATENT DOCUMENTS

| 10,815,312 B2 * | 10/2020 | Park .................. A61L 27/222 |
| 2010/0016231 A1 | 1/2010 | Kjaer et al. |
| 2011/0251139 A1 | 10/2011 | Kjaer et al. |
| 2013/0210707 A1 * | 8/2013 | Chung ............... C07K 14/4723  514/2.4 |
| 2017/0042963 A1 * | 2/2017 | Park .................. A61K 47/30 |

FOREIGN PATENT DOCUMENTS

| CN | 105288590 A | 2/2016 |
| EP | 2583684 A2 | 4/2013 |
| KR | 20110044863 A | 5/2011 |
| KR | 101320472 B1 | 10/2013 |
| KR | 101693533 B1 | 1/2017 |
| KR | 20170017385 A | 2/2017 |
| KR | 20190108416 A | 9/2019 |
| WO | 0240512 A2 | 5/2002 |
| WO | 2013007596 A2 | 1/2013 |
| WO | 2017186250 A1 | 11/2017 |
| WO | 2019035545 A1 | 2/2019 |
| WO | 2019092201 A2 | 5/2019 |
| WO | 2019101773 A2 | 5/2019 |
| WO | 2019177312 A1 | 9/2019 |
| WO | 2020046001 A1 | 3/2020 |

OTHER PUBLICATIONS

Lee, J. Y, et al., "Identification of a cell-penetrating peptide domain from human betadefensin 3 and characterization of its anti-inflammatory activity", Int J Nanomedicine, vol. 10, 5423-5434 (Year: 2015).*
Williams et al., Diabetes and Nonalcoholic Fatty Liver Disease: A Pathogenic Duo, Endocrine Reviews; 34(1): 84-129 (Year: 2013).*
Bai, X. , et al., "Potential roles of placental human beta-defensin-3 and apolipoprotein B mRNA-editing enzyme catalytic polypeptide 3G in prevention of intrauterine transmission of hepatitis B virus", J. Med. Virol., 87(3), Sep. 7, 2014, 375-379.
Cousens, L. S, et al., "Different Accessibilities in Chromatin to Histone Acetylase", J. Biol. Chem., 254(5), 1979, 1716-1723.
Derakhshankhan, H. , et al., "Cell penetrating peptide: a concise review with emphasis on biomedical applications", Biomed. & Pharma., vol. 108, Sep. 28, 2018, 1090-1096.
Glozak, M. A, et al., "Acetylation and deacetylation of non-histone proteins", Gene 363, 2005, 15-23.

(Continued)

*Primary Examiner* — Fred H Reynolds
*Assistant Examiner* — Sara E Konopelski Snavely
(74) *Attorney, Agent, or Firm* — Elmore Patent Law Group, P.C.; Joseph C. Zucchero; Carolyn S. Elmore (57) ABSTRACT

The present invention relates to a novel use of a peptide for inhibiting the functions and expressions of multiple disease biomarkers, and more specifically, to a pharmaceutical composition for treating or preventing inflammation, metabolic diseases or fibrotic diseases, the composition comprising any one or more peptide among peptides which are represented by the amino acid sequences of SEQ ID NOs: 1 to 8 have the functions of inhibiting HDAC5 phosphorylation, the expression of the GDF15 protein, and the expression of the ATF3 protein. The peptide, according to the present invention, enables the triple-blocking of the biomarkers associated with inflammation, metabolic diseases or fibrotic diseases by inhibiting HDAC phosphorylation, inhibiting the expression of the GDF15 protein and inhibiting the expression of the ATF3 protein, and thus the production of inflammatory cytokine may be reduced, and thus the peptide is effective in preventing and treating inflammatory, metabolic or fibrotic diseases.

8 Claims, 8 Drawing Sheets

Specification includes a Sequence Listing.

(56) References Cited

OTHER PUBLICATIONS

Hotamisligil, G. S, "Inflammation, metaflammation and immunometabolic disorders", Nature, 542, Feb. 9, 2017, 177-185.
Itazaki, H. , et al., "Isolation and Structural Elucidation of New Cyclotetrapeptides, Trapoxins A and B, Having Detransformation Activities as Antitumor Agents", J. Antibiotics, 43(12), Dec. 1990, 1524-1534.
Jadhav, K. , et al., "Activating transcription factor 3 in immune response and metabolic regulation", Liver Research, vol. 1(2), Sep. 2017, 96-102.
Kijima, M. , et al., "Trapoxin, an Antitumor Cyclic Tetrapeptide, Is an Irreversible Inhibitor of Mammalian Histone Deacetylase", J. Biol. Chem., 268(30), Oct. 25, 1993, 22429-22435.
Kim, J. Y, et al., "Activating transcription factor 3 is a target molecule linking hepatic steatosis to impaired glucose homeostasis", J. of Hepatology, 67, 2017, 349-359.
Koo, B. K, et al., "Growth differentiation factor 15 predicts advanced fibrosis in biopsy-proven non-alcoholic fatty liver disease", Liver International, 38, 2018, 695-705.
Lee, J. Y, et al., "Identification of a cell-penetrating peptide domain from human betadefensin 3 and characterization of its anti-inflammatory activity", Int J Nanomedicine, vol. 10, Aug. 26, 2015, 5423-5434.
Nishikawa, M. , et al., "Prevention of the Onset and Progression of Collagen-Induced Arthritis in Rats by the Potent p38 Mitogen-Activated Protein Kinase Inhibitor FR167653", Arth. & Rheuma., vol. 48, Sep. 9, 2003, 2670-2681.
Parfitt, A. M., et al., "Bone Histomorphometry : Standardization of Nomenclature, Symbols, and Units", J. Bone Miner. Res., 2(6), 1987, 595-610.

Ratnam, N. M, et al., "NF-kB regulates GDF-15 to suppress macrophage surveillance during early tumor development", J. of Clin. Invest., vol. 127, No. 10, Oct. 2017, 3796-3809.
Semple, F. , et al., "Human beta-defensin 3 has immunosuppressive activity in vitro and in vivo", Euro. J. Immunol., 40(4), Jan. 26, 2010, 1073-1078.
Seok, J. , et al., "Genomic Responses in Mouse Models Poorly Mimic Human Inflammatory Diseases", PNAS, 110(9), Feb. 26, 2013, 3507-3512.
Sheng, Q. , et al., "Human β-defensin-3 promotes intestinal epithelial cell migration and reduces the development of necrotizing enterocolitis in a neonatal rat model", Pediatr. Res., 76(3), Jun. 23, 2014, 269-279.
Shiozawa, S. , et al., "Studies on the contribution of c-fos/AP-1 to arthritic joint destruction", J Clin Invest., 99(6), Mar. 6, 1997, 1210-1216.
Varoga, D. , et al., "Human beta-defensin 3 mediates tissue remodeling processes in articular cartilage by increasing levels of metalloproteinases and reducing levels of their endogenous inhibitors", Arthritis & Rheumatism, 52(6), Jun. 2, 2005, 1736-1745.
Willy, J. , et al., "CHOP Links Endoplasmic Reticulum Stress to NF-kB Activation in the Pathogenesis of Nonalcoholic Steatohepatitis", Mol. Bio. of Cell, vol. 26, Jun. 15, 2015, 2190-2204.
Yoshida, M. , et al., "Effects of Trichostatins on Differentiation of Murine Erythroleukemia Cells", Cancer Res., 47, 1987, 3688-3691.
Yoshida, M. , et al., "Potent and Specific Inhibition of Mammalian Histone Deacetylase Both in Vivo and in Vitro by Trichostatin A", J. Biol. Chem., 265(28), Oct. 5, 1990, 17174-17179.
Yoshida, M. , et al., "Reversible Arrest of Proliferation of Rat 3Y1 Fibroblasts in Both the G1 and G2 Phases by Trichostatin A", Exp. Cell Res., 177, 1988, 122-131.

* cited by examiner

DIO: HFD-induced obesity, one type of NASH, HFD= high fat diet, 60% of total energy from fat

USE OF PEPTIDE FOR INHIBITING FUNCTIONS AND EXPRESSIONS OF MULTIPLE DISEASE BIOMARKERS

RELATED APPLICATIONS

This application is a divisional of U.S. application Ser. No. 17/272,010, filed Feb. 26, 2021, which is a US National stage entry of International Application No. PCT/KR2019/011037, which designated the United States and was filed on Aug. 29, 2019, published in Korean and which claims priority to KR Application No. 10-2018-0103615, filed Aug. 31, 2018 and KR Application No. 10-2019-0105917, filed Aug. 28, 2019. The entire teachings of the above applications are incorporated herein by reference.

SEQUENCE LISTING

The sequence listing submitted via EFS, in compliance with 37 CFR § 1.52 (e) (5), is incorporated herein by reference. The sequence listing XML file submitted via EFS contains the file 60223010US1SeqList.xml, created on Oct. 31, 2023, which is 8,076 bytes in size.

TECHNICAL FIELD

The present invention relates to the novel use of a peptide for inhibition of the function and expression of multiple disease biomarkers, and more particularly to a pharmaceutical composition for treating or preventing inflammatory, metabolic or fibrotic diseases containing, as an active ingredient, at least one of peptides represented by the amino acid sequences of SEQ ID NO: 1 to SEQ ID NO: 8 and having functions of inhibiting phosphorylation of HDAC5 proteins, expression of GDF15 proteins, and/or the expression of ATF3 proteins, with respect to HDAC5, GDF15 and ATF3, which are inflammatory and metabolic disease biomarkers.

BACKGROUND ART

The incidence of metabolic diseases including obesity and type 2 diabetes is rapidly increasing not only in Korea but also worldwide, and these metabolic diseases are known to be related to chronic inflammatory reactions (Nature, 2017, 542, 177). This phenomenon has been observed systemically and in individual tissues. In particular, it was found that obesity shows a chronic low level of inflammation, which is initiated and regulated by the accumulation and change of inflammatory cells in adipose tissue. Chronic adipose tissue inflammation induces insulin resistance of adipocytes and inhibits the ability of adipose tissue to accumulate excess energy.

In addition, alcoholic fatty liver is common in Korea, is caused by abnormal energy metabolism due to promotion of fat synthesis in the liver due to alcohol consumption, and can develop into hepatitis or cirrhosis depending on the level of alcohol consumption. Non-alcoholic fatty liver disease (NAFLD) is a disease caused by accumulation of fat (more than 5%) in the body, particularly, in hepatocytes, due to obesity, diabetes, and lipid metabolism abnormality, unrelated to alcohol consumption and refers to a wide range of diseases including simple accumulation of fat, steatosis, non-alcoholic steatohepatitis (NASH) showing hepatocellular inflammation, advanced fibrosis and cirrhosis.

Current treatments for alcoholic or non-alcoholic fatty liver patients are classified into two categories. First, drugs for treating and improving fatty liver through correction of risk factors include obesity drugs (orlistat), insulin-resistance drugs (metformin, pioglitazone, rosiglitazone), hyperlipidemia drugs (clofibrate, gemfibrozil, bezafibrate, atorvastatin, simvastatin) and the like. Second, drugs for recovery of already damaged hepatocytes and hepatic functions, independent of correction of risk factors for fatty liver, include hepatocyte protective agents (ursodeoxycholic acid and taurine), antioxidants (vitamin E) and nutritional supporters (lectin, betaine, N-acetylcysteine) and the like, but the therapeutic effects thereof are unsatisfactory.

Meanwhile, eukaryotic chromosomal DNA is wrapped around a central protein called a "histone" and is then condensed into a basic structure called a "nucleosome". In addition, a plurality of nucleosomes aggregates to form a chromatin structure. The constitution of this chromatin structure is closely related to histone post-translational modification, and known post-translational modification includes acetylation, methylation, phosphorylation, ubiquitination, and the like. Among them, the balance between acetylation and deacetylation of histones plays a very important role in gene expression, and the acetylation of histones is reversibly controlled by histone acetylase (HAT) and histone deacetylase (HDAC). When HDAC is inhibited, the acetylation of histones is promoted by HAT, genes are released from the histones, and expression of the gene begins. HDAC is known to be involved in various biological processes such as immune response, cell cycle, differentiation and death. Among them, HDAC5 belongs to class II HDAC (HDAC 4-7, 9, 10), class II HDAC has tissue selectivity and regulates transcription by deacetylating the genes of the intracellular signaling proteins p53, NF-κB, p65, c-jun transcription factors and JAK/STAT, and these intracellular signaling proteins are important mediators involved in the production of various inflammatory cytokines (Gene. 2005; 363: 15-23).

HDAC5 normally binds to the nucleosomes of the inflammatory cytokine gene, but HDAC5 is phosphorylated and then binds to the protein chaperone 14-3-3, upon exposure to inflammatory factors such as lipopolysaccharide and TNF-α. These binding products move from the nucleus to the cytoplasm. Subsequently, as histones are acetylated, the DNA structure is released, mediators such as NF-kB bind to the genes of the inflammation-inducing cytokine, and as a result, expression of the gene begins. Therefore, when the phosphorylation of HDCA5 is inhibited, allowing HDCA5 to be present in the nucleus, inflammatory cytokines cannot be expressed, so an inflammatory reaction does not occur.

HDAC inhibitors have been developed, and include butyric acid, which has functions of cell cycle arrest, and normalization and differentiation of transformed cells (J. Biol. Chem., 1979, 254, 1716-1723), tricostatin A, which is a metabolite of microorganisms having functions of cell cycle arrest, and morphological differentiation (Cancer Res., 1987, 47, 3688-3691, Exp. Cell Res., 1988, 177, 122-131, J. Biol. Chem., 1990, 265, 17174-17179), trapoxin, which is metabolite of microorganisms having an inhibitory effect against cell proliferation (J. Antibiotics, 1990, 43, 1524-1534, J. Biol. Chem., 1993, 268, 22429-22435), and the like. Anticancer agents such as vorinostat (SAHA), romidepsin (FK228) and panobinostat (LBH-589) have been developed. However, these HDAC inhibitors based on low-molecular-weight synthesized substances irreversibly bind to the active site of HDAC and completely inhibit the activity of the enzyme, thus causing unexpected side effects. Therefore, there is a need for HDAC inhibitors that have fewer side effects than conventional low-molecular-weight synthetic-substance-based HDAC inhibitors and have mechanisms different therefrom.

ATF3 (activating transcription factor 3) protein is a component of the mammalian activation transcription factor/cAMP responsive element-binding (CREB) protein of transcription factors. The ATF3 gene has been known to be expressed by various signals generated by various factors involved in cancer development, and to be involved in the complicated process of intracellular stress response.

ATF3 protein acts as an activator or repressor of known target genes, there are more than 20 potential target genes of ATF3 known in the literature to date, and known potential target genes of ATF3 include AdipoR1, AdipoR2, bNIP3, Cdc25A, CCL2, CCL4, Cyclin D1, FN-1, GLUT4, HIF-2α, IFN-γ, IL-1β, TWIST1, p53, p73, PDX-1, adiponectin, and the like.

In addition, various pathways such as NF-κB, JNK Erk, p38 and PKC induce ATF3 in most cells including fibroblasts and epithelial cells, as well as in immune cells such as macrophages, mast cells, T cells, and dendritic cells, and the induced ATF3 is involved in apoptosis, cell proliferation, cell motility, and DNA repair and metabolism by regulating the transcription of various genes. Among them, it is known to be associated with induction of NF-κB-related inflammatory reactions. The expression of ATF3 protein is also known as a biomarker of non-alcoholic liver disease caused by metabolic abnormalities such as diabetes and obesity (Kim et al., Journal of Hepatology 2017 vol. 67, 349-359).

Therefore, the inflammatory response induced by ATF3 can be inhibited by substances that regulate the expression or function of the ATF3 protein, but no inhibitor for the ATF3 protein has been developed to date.

GDF15 (growth differentiation factor 15) is a protein belonging to the transforming growth factor β (TGF-β) superfamily. This is also called "macrophage inhibitory cytokine 1", "placental TGF-β prostate-derived factor (PDF)", and "nonsteroidal anti-inflammatory drug-activator gene". GDF15 protein is known to be strongly expressed in the liver of NAFLD patients. As fibrosis actively progresses, the expression level of GDF15 protein increases in hepatic tissue. Treatment of human hepatic stellate cells with recombinant human GDF15 (rhGDF15) has been found to increase the expression of proteins (SMAD2, SMAD3) relating to cirrhosis (Koo et al., Liver International. 2018; 38: 695-705). Thus, the GDF15 protein functions to develop cirrhosis from NAFLD, and also acts as a biomarker. A substance capable of inhibiting the expression of GDF15 may be developed to reduce the progression of NAFLD, but an inhibitor for the GDF15 protein has not been developed to date.

Accordingly, the present inventors have found that peptides previously developed by the present inventors have the effects of inhibiting the phosphorylation of HDAC, of inhibiting the expression of ATF3 and GDF15, which are liver disease markers, and thus of suppressing the production of various inflammatory cytokines, and have found that administration of the peptides to the arthritis animal model, the colitis animal model and the fatty liver animal model can exert therapeutic effects on the corresponding diseases. Based on this finding, the present invention has been completed.

DISCLOSURE

Therefore, the present invention has been made in view of the above problems, and it is an object of the present invention to provide the novel use of a peptide for inhibition of the function and expression of multiple disease biomarkers.

In accordance with one aspect of the present invention, the above and other objects can be accomplished by the provision of a pharmaceutical composition for treating or preventing inflammatory, metabolic or fibrotic diseases comprising, as an active ingredient, a peptide represented by any one amino acid sequence selected from the group consisting of SEQ ID NO: 1 to SEQ ID NO: 8.

In accordance with another aspect, provided is the use of the peptide for the treatment of inflammatory diseases, metabolic diseases or fibrotic diseases.

In accordance with another aspect, provided is the use of the composition in the preparation of a medicine for inflammatory diseases, metabolic diseases or fibrotic diseases.

In accordance with another aspect, provided is a method for preventing and/or treating inflammatory diseases, metabolic diseases or fibrotic diseases comprising administering the peptide to a subject in need thereof.

BEST MODE

Unless defined otherwise, all technical and scientific terms used herein have the same meanings as appreciated by those skilled in the field to which the present invention pertains. In general, the nomenclature used herein is well-known in the art and is ordinarily used.

The present invention is based on the finding that the peptide represented by the amino acid sequence of any one of SEQ ID NOS: 1 to 8 inhibits phosphorylation of HDAC5, and reduces the expression of GDF15 and ATF3 proteins, with regard to HDAC5, GDF15 and ATF3, which are biomarkers of inflammation, metabolic or fibrotic diseases to thereby reduce the production of inflammatory cytokines, and thus can exhibit the effect of reducing arthritis, periodontitis, atopy, inflammatory colitis, diabetes as well as non-alcoholic liver diseases, fatty liver, and subcutaneous fat caused by obesity.

Thus, in one aspect, the present invention is directed to a pharmaceutical composition for treating or preventing inflammatory, metabolic or fibrotic diseases containing, as an active ingredient, a peptide represented by any one amino acid sequence selected from the group consisting of SEQ ID NO: 1 to SEQ ID NO: 8.

Also, in another aspect, the present invention is directed to the use of the peptide for the treatment of inflammatory diseases, metabolic diseases or fibrotic diseases.

In another aspect, the present invention is directed to the use of the peptide in the preparation of a medicine for inflammatory diseases, metabolic diseases or fibrotic diseases.

In another aspect, the present invention is directed to a method for preventing and/or treating inflammatory diseases, metabolic diseases or fibrotic diseases including administering the peptide to a subject in need thereof.

|  | | SEQ ID NO: 1 |
|---|---|---|
|  | GKCSTRGRKCCRRKK | |
|  | | SEQ ID NO: 2 |
| (M1) | GKCSTRGRKCMRRKK | |
|  | | SEQ ID NO: 3 |
| (M2) | GKCSTRGRKMCRRKK | |
|  | | SEQ ID NO: 4 |
| (M3) | GKCSTRGRKMMRRKK | |
|  | | SEQ ID NO: 5 |
| (M4) | GKMSTRGRKCCRRKK | |
|  | | SEQ ID NO: 6 |
| (M5) | GKMSTRGRKCMRRKK | |
|  | | SEQ ID NO: 7 |
| (M6) | GKMSTRGRKCMRRKK | |
|  | | SEQ ID NO: 8 |
| (M7) | GKMSTRGRKMMRRKK | |

In the present invention, the peptide may be represented by any one amino acid sequence selected from the group consisting of SEQ ID NOS: 1 to 8, and may have a homology of 60% or more, 70% or more, 80% or more, 90% or more, or 95% or more with the amino acid sequence. It will be obvious to those skilled in the art that any one amino acid sequence selected from the group consisting of SEQ ID NOS: 1 to 8 may be appropriately substituted to accomplish the object of the present invention; for example, some amino acids (for example, 1 to 6 amino acids) in the amino acid sequence of the peptides of SEQ ID NOS: 1 to 8 may be substituted with other amino acids, or some amino acids (for example, 1 to 6 amino acids) in the amino acid sequence of the peptides of SEQ ID NOS: 1 to 8 may be added or deleted, as long as an advantageous effect on the stability of the peptide is imparted thereto without affecting the desired structure or function of the peptide.

In the present invention, the inflammatory, metabolic or fibrotic disease may be a disease that is caused directly/indirectly in vivo by the hyperphosphorylation of HDAC5 protein, overexpression of GDF15 protein and/or overexpression of ATF3 protein, and the peptide can inhibit the phosphorylation of the HDAC5 protein, the expression of the GDF15 protein and/or the expression of the ATF3 protein.

In the present invention, the inflammatory, metabolic or fibrotic disease may include at least one selected from the group consisting of arthritis, inflammatory colitis, ulcerative enteritis, Crohn's disease, hepatitis, fatty liver, and obesity, but is not limited thereto. In addition, the peptide may be used for the treatment and prevention of all inflammatory, metabolic or fibrotic diseases related to the phosphorylation of HDAC5 protein, overexpression of GDF15 protein and/or overexpression of ATF3 protein.

In the present invention, the hepatitis may be non-alcoholic steatohepatitis caused by diabetes and/or obesity.

In the present invention, the fibrous disease includes at least one selected from the group consisting of cirrhosis caused by fibrosis, pulmonary fibrosis, obstructive pulmonary disease, heart failure, arteriosclerosis, chronic kidney failure, diabetes, and keloids caused by postoperative sequelae, but is not limited thereto. In the present invention, hyperphosphorylation refers to a condition of increased phosphorylation of protein compared to a subject not suffering from the disease, and overexpression refers to a condition of increased expression of protein compared to a subject not having the disease.

The pharmaceutical composition of the present invention may further contain at least one pharmaceutically acceptable carrier in addition to the peptide. The pharmaceutically acceptable carrier may be saline, sterile water, Ringer's solution, buffered saline, dextrose solution, maltodextrin solution, glycerol, ethanol, and a combination of one or more of these components. If necessary, other conventional additives such as antioxidants, buffers and bacteriostatic agents may be added. In addition, diluents, dispersants, surfactants, binders and lubricants may be further added to prepare injectable formulations such as aqueous solutions, suspensions and emulsions, as well as pills, capsules, granules or tablets.

Therefore, the composition of the present invention may be prepared in any one formulation selected from the group consisting of injections, formulations for oral administration, patches, solutions, capsules, granules, tablets, powders, sprays, ointments, gels, mucosal formulations and suppositories, but is not limited thereto. These formulations can be prepared by a conventional method used for formulation in the art or by a method disclosed in Remington's Pharmaceutical Science (latest edition), Mack Publishing Company, Easton PA, and can be prepared in various formulations depending on each disease or component.

The therapeutic pharmaceutical composition may be formulated such that it additionally contains a pharmaceutically acceptable adjuvant, and the pharmaceutically acceptable adjuvant may include at least one selected from the group consisting of excipients, diluents, buffers, antimicrobial preservatives, surfactants, antioxidants, thickeners and viscosity modifiers, but is not limited thereto.

The composition of the present invention may be administered orally or parenterally (for example, intravenous, subcutaneous, intraperitoneal or topical application) according to a desired method, and the dose may be varied depending on the patient's weight, age, gender, state of health, diet, administration time, administration method, excretion rate, and disease severity. When the peptides of SEQ ID NOS: 1 to 8 of the present invention are used for the treatment of inflammatory diseases, metabolic diseases, autoimmune diseases, and/or fibrotic diseases, the daily dose of the peptides of SEQ ID NOS: 1 to 8 is about 1 to about 100 mg/kg, preferably 5 to 50 mg/kg, and may be administered once a day or 2 to 3 times a week, but is not limited thereto.

In this case, the administration regimen and dose vary depending on the age, weight and response of an individual patient. A suitable regimen and dosage can be easily selected by those skilled in the art who take these factors into consideration.

EXAMPLE

Hereinafter, the present invention will be described in more detail with reference to examples. However, it will be obvious to those skilled in the art that these examples are provided only for illustration of the present invention and should not be construed as limiting the scope of the present invention.

Example 1: Synthesis of Peptide

Peptides of SEQ ID NOS: 1 to 8 in order from the N-terminus were synthesized using F-moc solid phase peptide synthesis. The synthesized peptide sequences were cut from the resin, washed, lyophilized, and then separated and purified by liquid chromatography. The molecular weight of the purified peptides was determined using MALDI-TOF analysis.

|  |  | SEQ ID NO: 1 |
|---|---|---|
|  | GKCSTRGRKCCRRKK |  |
| (M1) | GKCSTRGRKCMRRKK | SEQ ID NO: 2 |
| (M2) | GKCSTRGRKMCRRKK | SEQ ID NO: 3 |
| (M3) | GKCSTRGRKMMRRKK | SEQ ID NO: 4 |
| (M4) | GKMSTRGRKCCRRKK | SEQ ID NO: 5 |
| (M5) | GKMSTRGRKMCRRKK | SEQ ID NO: 6 |
| (M6) | GKMSTRGRKCMRRKK | SEQ ID NO: 7 |
| (M7) | GKMSTRGRKMMRRKK | SEQ ID NO: 8 |

Figure 1A:
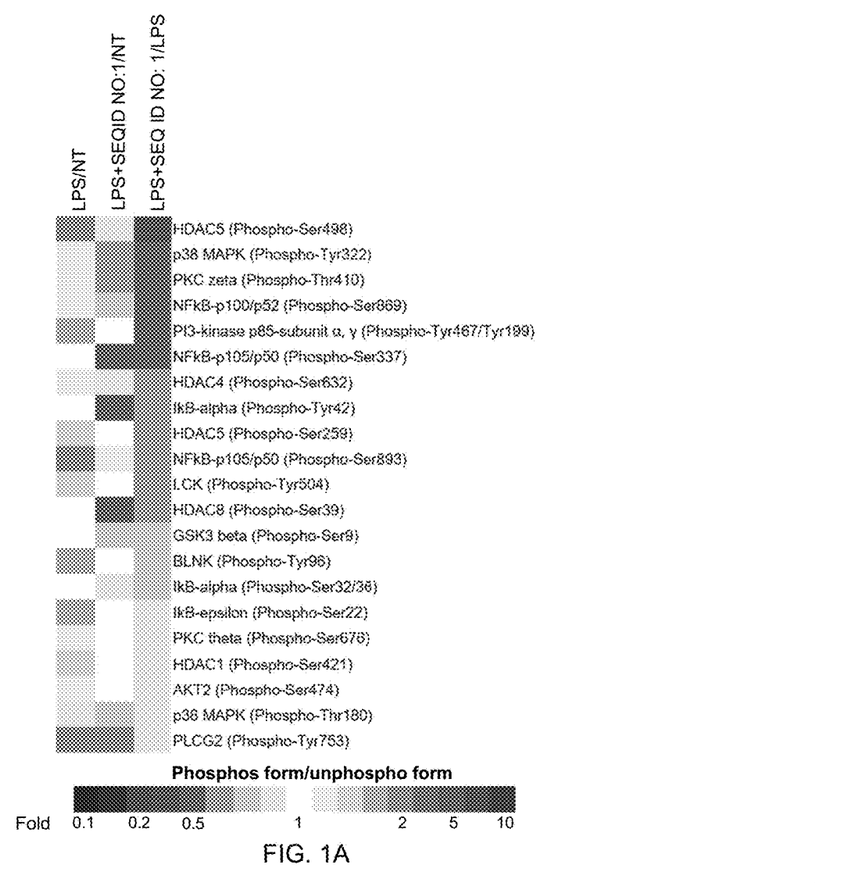
FIG. 1A shows a result of microarray of phosphorylated proteins.

Experimental Example 1: Determination of HDAC5 Phosphorylation Inhibition and Binding Affinity of Synthetic Peptide RAW 264.7 cells were starved in 0.5% FBS for 2 hours and treated with 200 μM of the peptide of SEQ ID NO: 1 for 1 hour, and then inflammation was induced at 37° C. for 30 minutes with LPS (1 μg/mL). Cell lysates of untreated cells (NT), cells treated with LPS, and cells treated with SEQ ID NO: 1 and LPS were applied to a Phospho explorer antibody microarray from Full Moon Biosystems. The phospho microarray is capable of recognizing 1318 antibodies related to 30 signaling systems. A standard-size coated glass microscope slide was coated with each antibody. =It was scanned with a GenePix 4100A scanner (Axon Instrument, Foster City, CA, USA). Data were analyzed with Genowiz 4.0™ (Ocimum Biosolutions, Hyderabad, India). The phosphorylation ratio was calculated as follows.

Formula for calculating phosphorylation ratio in each antibody:

Phosphorylation ratio=(phosphorylation value of experimental group/non-phosphorylation value of experimental group)/(phosphorylation value of control group/non-phosphorylation value of control group)

After analysis, information on each protein was searched for using the UniPort database. As a result, in the case of treatment with the peptide of SEQ ID NO: 1 and LPS, phosphorylation of HDAC5 was inhibited the most (0.278), compared to cells treated with only LPS, and phosphorylation of proteins related to NF-κB signals, such as NF-κB p100/p52 (0.451), NF-κB p105/p50 (0.485) and IκBα (0.509) was inhibited (FIG. 1A).

Figure 1B:
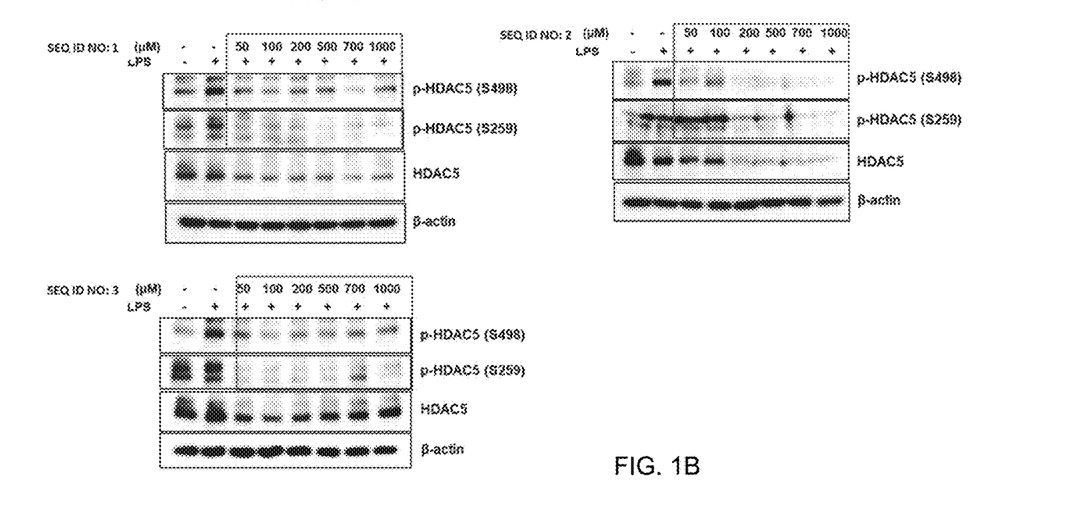
FIG. 1B shows a result of Western blot for detecting the expression level of phosphorylated HDAC5 protein depending on changes in the concentration of the peptides of SEQ ID NOS: 1 to 3.

The changes in phosphorylation of HDAC5 and p65 by the peptides of SEQ ID NOS: 1 to 3 were detected using Western blot, based on the results of the microarray. RAW 264.7 cells were plated at a density of 70% on a 6-well plate. 16 hours later, the cells were starved with DMEM medium containing 0.5% FBS for 2 hours. The cells were treated with a medium containing each of the peptides of SEQ ID NOS: 1 to 3 at a concentration of 50 to 1000 μM for 1 hour, and were then treated with LPS at a concentration of 1 µg/ml to induce an inflammatory response for 30 minutes. Proteins were lysed using RIPA lysis buffer (25 mM Tris·HCl pH 7.6, 150 mM NaCl, 1% NP-40, 1% sodium deoxycholate, 0.1% SDS) containing a protease inhibitor and a phosphatase inhibitor. Proteins were assayed through BCA protein assay, and expression levels of HDAC5 and p65 proteins were detected by western blot. Western blot was conducted by loading each sample along with an equal amount of a size marker on an 8% SDS PAGE gel, followed by electrophoresis for about 2 hours and transfer to a nitrocellulose membrane. The transferred membrane was blocked with 5% skim milk for 1 hour, and was reacted with the primary antibody overnight at a ratio of 1:1000. Then, the membrane was washed with TBST containing 0.1% tween-20 and reacted with a secondary antibody to which HRP was adhered for 1 hour, and then chemiluminescence was detected with an ECL substrate.

As a result, when treated with LPS alone, the phosphorylation of HDAC5 was increased, but when treated with a combination of LPS and peptides of SEQ ID NOS: 1 to 3, the phosphorylation of HDAC5 was decreased. This indicates that the peptides of SEQ ID NOS: 1 to 3 have an effect of inhibiting signaling through HDAC5.

Figure 1C:
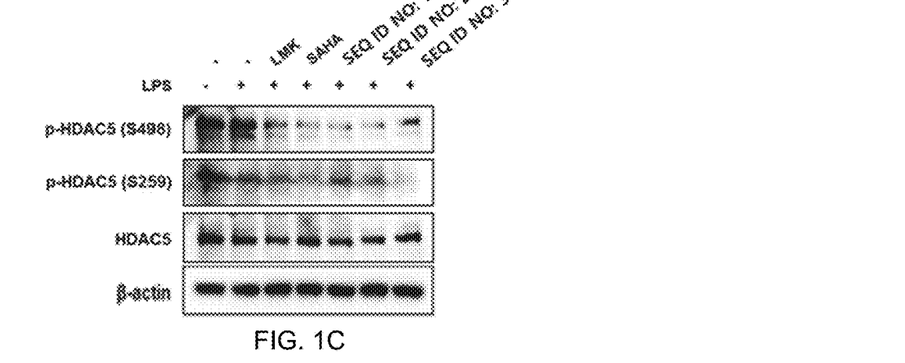
FIG. 1C shows a result for Western blot for comparing the inhibitory effect of phosphorylation of HDAC5 protein by the peptides of SEQ ID NOS: 1 to 3 with positive control groups, LMK and SAHA.

In addition, the degree of phosphorylation of the phosphorylated HDAC5 protein and the HDAC5 protein was detected using Western blot for each of the peptides of SEQ ID NOS: 1 to 3 and the previously known HDAC phosphorylation inhibitors SAHA and LMK. The result showed that the peptides of SEQ ID NOS: 1 to 3 exhibited better HDAC5 phosphorylation inhibition than SAHA and LMK.

Meanwhile, the binding affinity between HDAC5 and the peptides of SEQ ID NOS: 1 to 8 was detected using Biacore T200 (BIAcore AB, Uppsala, Sweden). For this purpose, HDAC5 protein (Abcam, MA, USA) was dissolved in sodium acetate buffer (pH 4.5), and was bound to a dextran-covered sensor chip surface (CM5 chip) using N-hydroxysuccinimide (NHS) and N-ethyl-N0-(3-dimethylaminopropyl)-carbodiimide hydrochloride (EDAC) as crosslinkers. The unreacted active group of dextran was blocked by the addition of ethanolamine (1M) thereto. The number of HDAC5 binding to the chip was measured as 4440RU (1000 RU=1 ng/mm$^2$). The peptides of SEQ ID NOS: 1 to 8 were reacted at various concentrations (15.625, 31.25, 62.5, 125, 250, 500 nM) at a rate of 30 µL/min, and the dissociation reaction was maintained for 5 minutes. Rate constants for association (ka) and dissociation (kd), and a dissociation constant (KD) were calculated using BIAevaluation software and a 1:1 binding model.

The following Table 1 shows the result of analysis using Biacore, indicating the binding affinity between the peptides of SEQ ID NOS: 1 to 8 and HDAC5 protein. When compared to the mismatched peptide, the peptides of SEQ ID NOS: 1 to 8 had a KD value of about $10^{-7}$, and the mismatched peptide was $10^{-4}$. As the KD value decreases, the binding affinity increases. Thus, it can be predicted that the peptides of SEQ ID NOS: 1 to 8 have excellent binding force to the HDAC5 protein and reduce phosphorylation while binding to the HDAC5 protein.

TABLE 1

| Analyte | ka (1/Ms) | kd (1/s) | KD (M) |
| --- | --- | --- | --- |
| SEQ ID NO: 1 | 1.075E+5 | 0.07264 | 6.756E−7 |
| SEQ ID NO: 2 (M1) | 7.437E+4 | 0.06872 | 9.241E−7 |
| SEQ ID NO: 3 (M2) | 8.213E+4 | 0.05953 | 7.248E−7 |
| SEQ ID NO: 4 (M3) | 7.223E+4 | 0.06788 | 9.399E−7 |
| SEQ ID NO: 5 (M4) | 6.592E+4 | 0.03088 | 4.685E−7 |
| SEQ ID NO: 6 (M5) | 1.004E+5 | 0.04463 | 4.443E−7 |
| SEQ ID NO: 7 (M6) | 6.754E+4 | 0.04757 | 7.043E−7 |
| SEQ ID NO: 8 (M7) | 5.501E+4 | 0.004776 | 8.682E−8 |
| Mismatched peptide | 2.168E+3 | 1.847 | 8.521E−4 |

Experimental Example 2. Determination of Therapeutic Effect on Arthritis of Synthetic Peptides In order to determine whether or not the peptide according to the present invention is effective in treating rheumatoid arthritis in vivo, the effect of treating arthritis thereof was detected in a collagen-induced arthritis animal model. For this purpose, female Wistar rats (105-135 g, n=67) were purchased from Harlan Co. Ltd. (Indianapolis, IN, USA). All rats were bred in a pathogen-free environment and sterilized standard rat feed (Harlan Co. Ltd, USA) and water were freely fed to the rats. Animal experiments were conducted with the approval of the Institutional Animal Care and Use Committee (IACUC) of Seoul National University. Collagen-induced arthritis was induced in a known manner (Nishikawa et al., Arthritis and rheumatism. 2003; 48:2670-81).

Figure 2A:
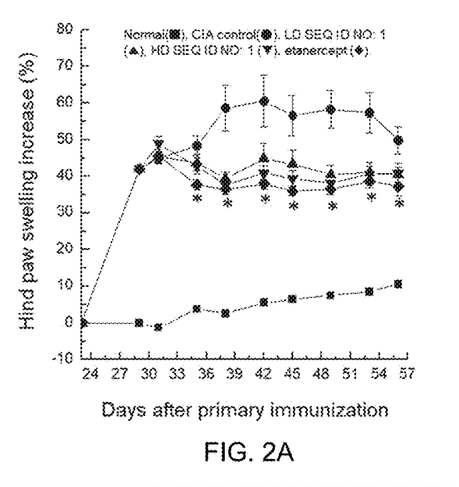
FIG. 2A shows hind paw swelling (%) upon administration of SEQ ID NO: 1 and etanercept to an arthritis-induced animal model.
Figure 2B:
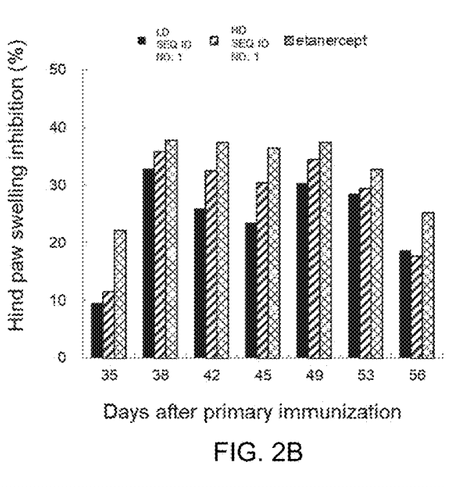
FIG. 2B shows hind paw swelling inhibition (%) upon administration of SEQ ID NO: 1 and etanercept to the arthritis-induced animal model.

Specifically, 500 µg of bovine collagen type II was injected along with a mixture of 0.5 mL of 0.1 M acetic acid and 0.5 mL of Freund's incomplete adjuvant into rat muscle. On the 7$^{th}$ day, 0.5 mL of 0.1 M acetic acid and 0.5 mL of Freund's incomplete adjuvant were further inoculated along with 250 µg of bovine collagen type II to produce collagen-induced arthritis (CIA) rats. The rats were classified into a CIA-induced group (n=10), a CIA-induced group injected with a low concentration of the peptide of SEQ ID NO: 1 (LD AIP, 15 mg/kg, n=10), a CIA-induced group injected with a high concentration of the peptide of SEQ ID NO: 1 (HD AIP, 30 mg/kg, n=10), a CIA-induced group injected with etanercept (Enbrel) (10 mg/kg, n=10), and a normal group (n=6). From 28 days after the first collagen injection, the peptide of SEQ ID NO: 1 was injected subcutaneously into the back of the neck twice a week over 4 weeks. Etanercept was injected intraperitoneally three times a week over 4 weeks. Swelling of both hind paws was measured twice using a plethysmometer (LE7500 N, IWOO Scientific Corporation, KOREA) on day 22, 29, 31, 35, 38, 42, 45, 49, 52, and 56. The plethysmometer was used after calibration to a weight of 3 mL. The measured area was marked by drawing a line, and measurement was conducted adjacent to the ankle. Hind paw swelling increase (%) and hind paw swelling inhibition (%) were calculated using the following equations.

$$\text{Hind paw swelling increase (\%)} = \frac{\text{Swelling after booster injection} - \text{Swelling before primary injection}}{\text{Swelling before primary injection}} \times 100$$

$$\text{Hind paw swelling inhibition (\%)} = \frac{\text{Mean swelling increase of CIA control group} - \text{Mean swelling increase of test group}}{\text{Mean swelling increase of CIA control group}} \times 100$$

The result of measurement of hind paw swelling (%) showed that, compared to the normal group, the CIA-induced group exhibited increased hind paw swelling, and the CIA-induced group injected with etanercept (Enbrel®), a positive control group, exhibited decreased hind paw swelling (%) within 35 to 56 days (P<0.05). The CIA-induced group injected with SEQ ID NO: 1 exhibited a decrease in hind paw swelling (%) in a concentration-dependent manner. The CIA-induced group injected with the peptide of SEQ ID NO: 1 at a high concentration (30 mg/kg) exhibited a decrease in hind paw swelling (%) between 38 and 49 days (P<0.05).

As a result of measuring hind paw swelling inhibition (%), the CIA-induced group administered with a high concentration (30 mg/kg) of the peptide of SEQ ID NO: 1 was inhibited by 35% on the $38^{th}$ day. The CIA-inducing group administered with the peptide of SEQ ID NO: 1 at a low concentration (15 mg/kg) exhibited an inhibition of 32% on the $38^{th}$ day, and the CIA-induced group administered with etanercept exhibited an inhibition of 37%, indicating that the peptide of SEQ ID NO: 1 at a high concentration exhibited effects similar to the positive control group, etanercept.

In order to observe the degree of bone damage in the hind paw, microcomputed tomography (micro-CT) was performed using a SkyScan 1172 (SkyScan, Aartselaar, Belgium). The total volume (TV; $mm^3$), bone volume (BV; $mm^3$) and bone volume fraction (BV/TV; %) were analyzed using CTAn software. On the $57^{th}$ day, rats were sacrificed and subjected to histological analysis. Both hind paws and joints were collected, fixed in 10% buffered formalin, and demineralized in 30% citrate-buffered formic acid at 4° ° C. for 3 days. Paraffin blocks were produced, sliced into sections with a thickness of 4 µm and stained with hematoxylin and eosin (H&E), and then the pathological score was evaluated with an optical microscope. The joint inflammation index was measured based on the following criteria (Shiozawa et al., J Clin Invest. 1997; 99 (6):1210-1216). 0, normal synovium; 1, synovial membrane hypertrophy and cell infiltrates; 2, pannus and cartilage erosion; 3, major erosion of cartilage and subchondral bone; and 4, loss of joint integrity and ankylosis.

Figure 3A:
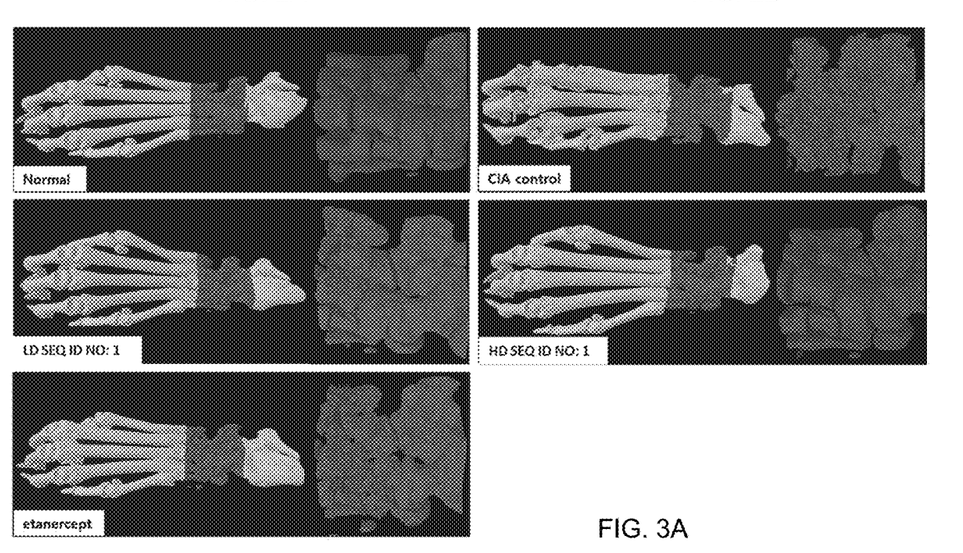
FIG. 3A is a three-dimensional micro-Ct image showing the arthritis-induced animal model administrated with SEQ ID NO: 1 and etanercept.

As a result, severe bone damage was observed in the CIA-induced group, whereas bone tissue was preserved in the CIA-induced group injected with the peptide of SEQ ID NO: 1, and in particular, the CIA-induced group injected with the peptide of SEQ ID NO: 1 at a high concentration showed similar effects to the CIA-induced group injected with Etanercept (FIG. 3A).

Figure 3B:
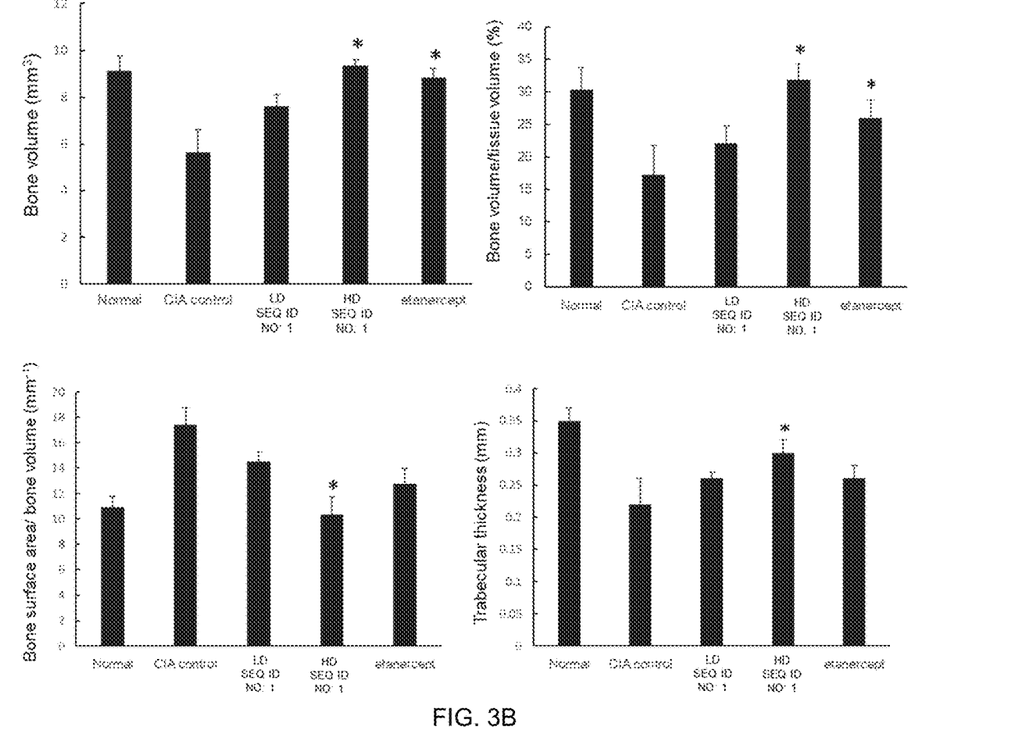
FIG. 3B shows results of analysis of bone volume (BV), bone volume/tissue volume (BV/TV), bone surface area adjusted to BV (BS/BV) and trabecular thickness (Tb.Th) in the arthritis-induced animal model administrated with SEQ ID NO: 1 and etanercept.

In addition, as a result of analyzing bone volume (BV), bone volume/tissue volume (BV/TV), bone surface area adjusted to BV (BS/BV), and trabecular thickness (Tb.Th), the CIA-induced group injected with a high concentration of SEQ ID NO: 1 exhibited high BV, BV/TV and Tb.Th and low BS/BV, indicating that the peptide of SEQ ID NO: 1 has the function of reducing arthritis while reducing bone damage in the joint area (FIG. 3B). Here, BV and BV/TV are parameters for comparing the preservation of bones in different sizes of samples. BS/BV is a parameter indicating that bone surface is lost due to erosion. Tb.Th is a parameter negatively associated with periarticular osteopenia by arthritis (Parfitt A M et al., J. Bone Miner. Res. 1987; 2 (6):595-610).

Figure 4A:
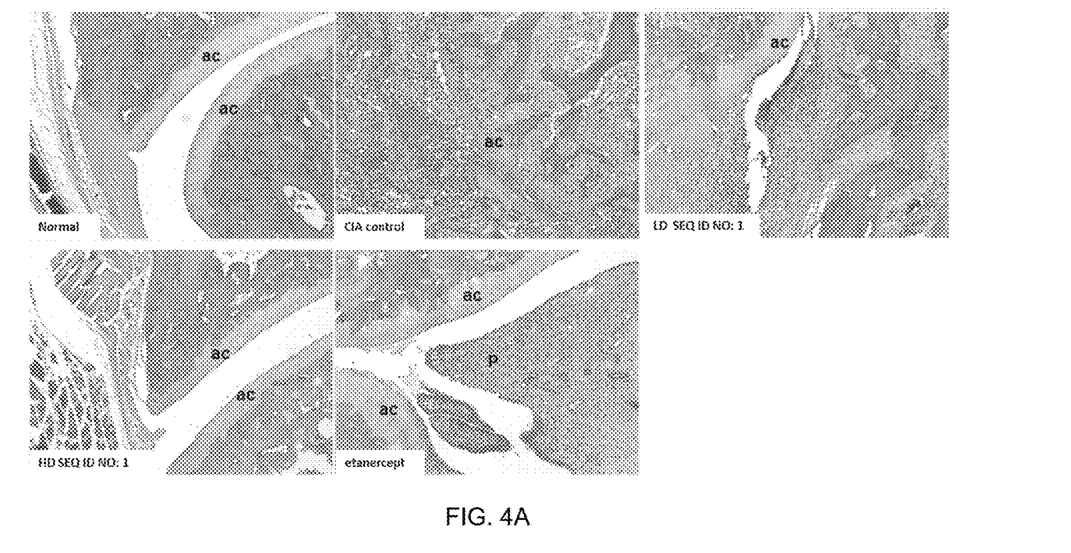
FIG. 4A is a microscope image showing a joint tissue after administration of SEQ ID NO: 1 and etanercept to the arthritis-induced animal model.

In addition, as a result of microscopic observation of tissues, the CIA-induced group showed chronic inflammation in synovial tissue, pannus formation, and joint and bone destruction, whereas the CIA-inducing group injected with the peptide of SEQ ID NO: 1 exhibited a decrease in inflammation in a concentration-dependent manner. The CIA-induced group injected with Etanercept showed results similar to the CIA-induced group injected with a low concentration of SEQ ID NO: 1 (FIG. 4A).

Figure 4B:
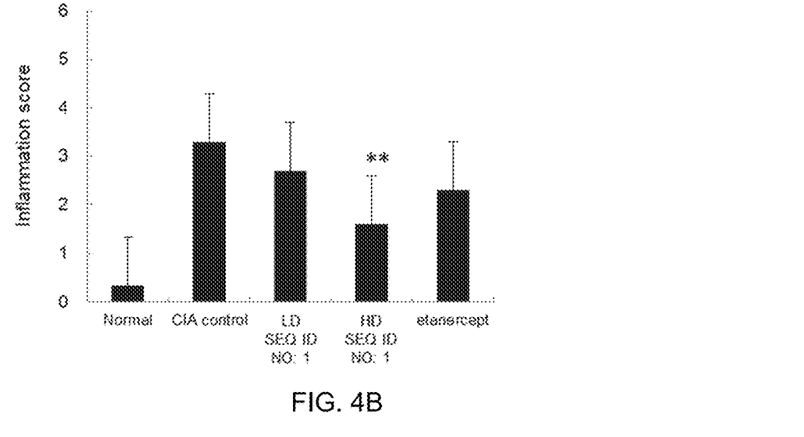
FIG. 4B shows inflammation index after administration of SEQ ID NO: 1 and etanercept to the arthritis-induced animal model.

The inflammation index was also found to be significantly lower in the CIA-induced group (1.5±1.17) injected with the peptide of SEQ ID NO: 1 compared to the CIA-induced group (3.3±0.67; p<0.01). On the other hand, it was found that the CIA-induced group (2.3±1.16) injected with etanercept did not have a significantly lower inflammation index than the CIA-induced group. Therefore, the peptide of SEQ ID NO: 1 was found to have better effects of inhibiting the invasion of inflammatory cells and of reducing arthritis symptoms in CIA-induced rats than etanercept (FIG. 4B).

The rats were sacrificed and systemic blood was collected, and the concentrations of TNF-α and IL-6 in the blood were measured with an ELISA kit (R&D, Minneapolis, MN, USA).

Figure 5:
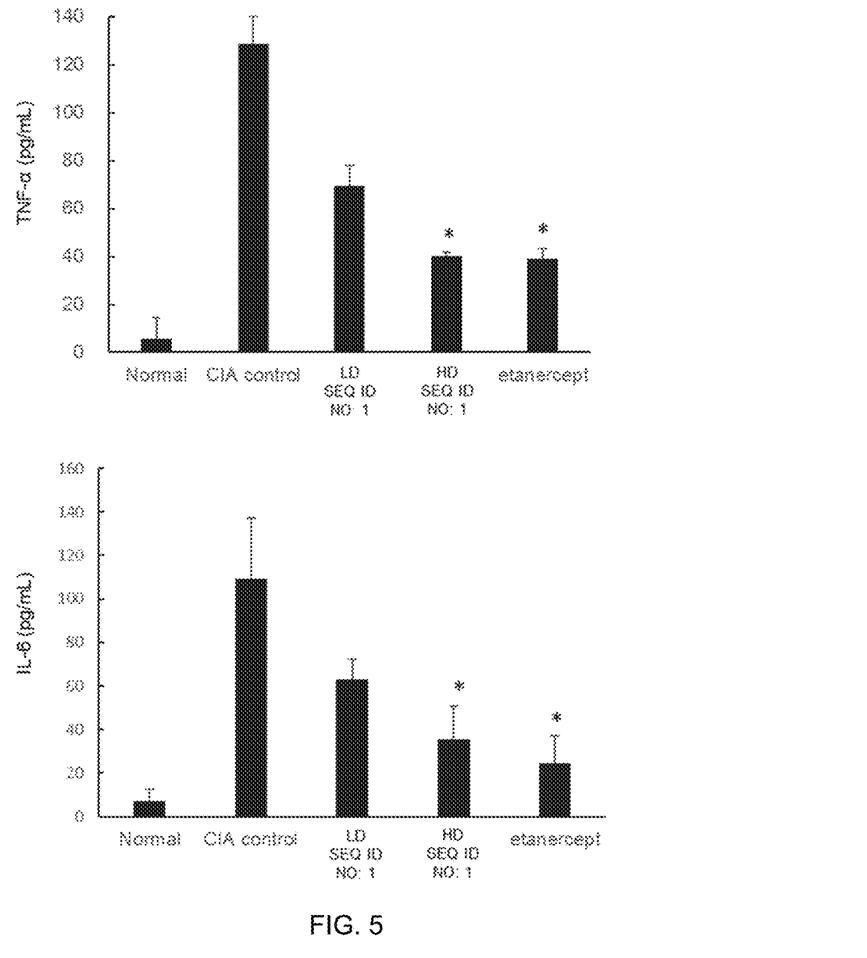
FIG. 5 shows the concentrations of TNF-a and IL-6 in blood upon the administration of SEQ ID NO: 1 and etanercept to the arthritis-induced animal model.

The result showed that the CIA-induced group exhibited a TNF-α concentration of 128 pg/ml and an IL-6 concentration of 109 pg/ml, but when a high concentration of the peptide of SEQ ID NO: 1 was injected, the concentration of TNF-α was 40.3 pg/mL, and the concentration of IL-6 was 35.2 pg/mL, and when etanercept was injected, the concentration of TNF-α was 39 pg/mL, and the concentration of IL-6 was 24 pg/mL (FIG. 5). It could be seen from this that the peptide of SEQ ID NO: 1 has an effect of reducing the concentrations of the inflammatory cytokines TNF-α and IL-6 in the blood, comparable to etanercept.

It can be inferred from the above results that the peptides of SEQ ID NOS: 1 to 8 inhibit the phosphorylation of HDAC5 and thus inhibit the production of inflammatory cytokines, thereby exhibiting anti-inflammatory activity and a therapeutic effect for arthritis.

Experimental Example 3: Determination of Therapeutic Effect for Inflammatory Colitis of Synthetic Peptides In order to determine whether or not the peptide according to the present invention has the effect of treating inflammatory colitis in vivo, the effect of treating colitis in a colitis-induced animal model was detected. Before induction of colitis, rats were allowed to drink water freely, although food was not supplied thereto for 24 hours. The rats were lightly anesthetized with ether. A rubber cannula (o.d., 2 mm) was inserted into the colon, the end of which was about 8 cm away from the anus and was located near the splenic flexure. 2,4,6-trinitro benzene sulfonic acid (TNBS; Sigma Chemical Co, St Louis, Missouri, USA) dissolved in a 50% (v/v) ethanolic aqueous solution was injected into the colon through the rubber cannula (15 mg/0.3 mL/rat). 72 hours after induction of colitis, the peptide of SEQ ID NO: 1 (30 mg/kg) was intraperitoneally injected once a day, and after administration for 7 days, the rats were sacrificed. The weight of the rats was measured at 9 AM every day, and the length of the colon was measured from the cecum to the anus using a vernier caliper (Mitutoyo, Japan) after rat sacrifice.

Figure 6A:
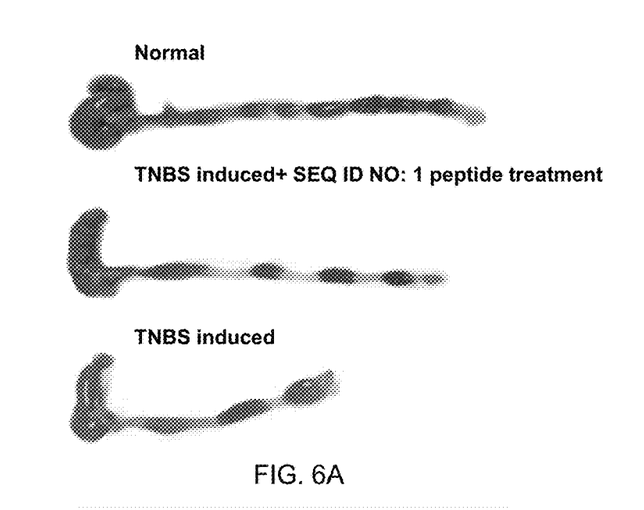
FIG. 6A shows a result of visual observation of the large intestine extracted 8 days after administration of SEQ ID NO: 1 to a colitis-induced animal model.

On the $8^{th}$ day of the experiment, the large intestine was removed from the rats and observed with the naked eye. As a result, the large intestine of the group (TNBS) in which colitis was induced by TNBS injection was remarkably shorter than that of the normal group, and exhibited congestion of large intestine tissue. However, the group injected with the peptide of SEQ ID NO: 1 after induction of colitis appeared similar to the normal group (CON), indicating that colitis was remarkably suppressed (FIG. 6A).

Figure 6B:
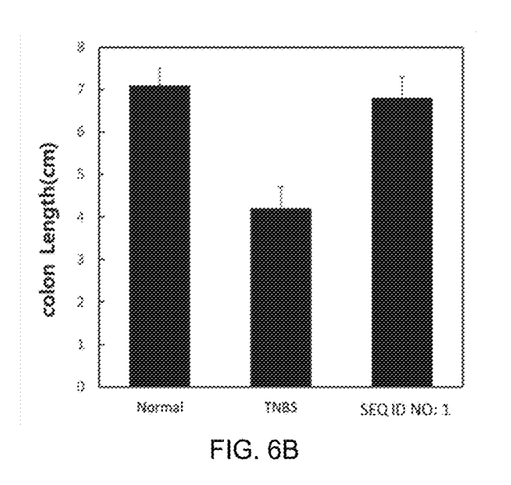
FIG. 6B shows the change in large intestine length upon the administration of SEQ ID NO: 1 to the colitis-induced animal model.

In addition, the result of measurement of the length of the extracted large intestine showed that the length of the large intestine of the group (TNBS) in which colitis was induced by TNBS injection was remarkably reduced compared to the normal group, but the length of the large intestine in the group injected with the peptide of SEQ ID NO: 1 was similar to that of the normal group.

The extracted large intestine was frozen and stored at −70° ° C., the mucous membrane tissue was collected from the muscle layer of the large intestine, the weight of the mucous membrane tissue was measured, and 10 mg of the mucous membrane tissue was lysed in a triple wash buffer (50 mM Tris-HCl, pH 8.0, 150 mM NaCl, 0.1% sodium deoxycholate and 1 mM phenylmethysulfonyl and homogenized. Then, p40, TNF-α, and IL-12 were assayed using an ELISA kit (R&D, Minneapolis, MN, USA).

Figure 6C:
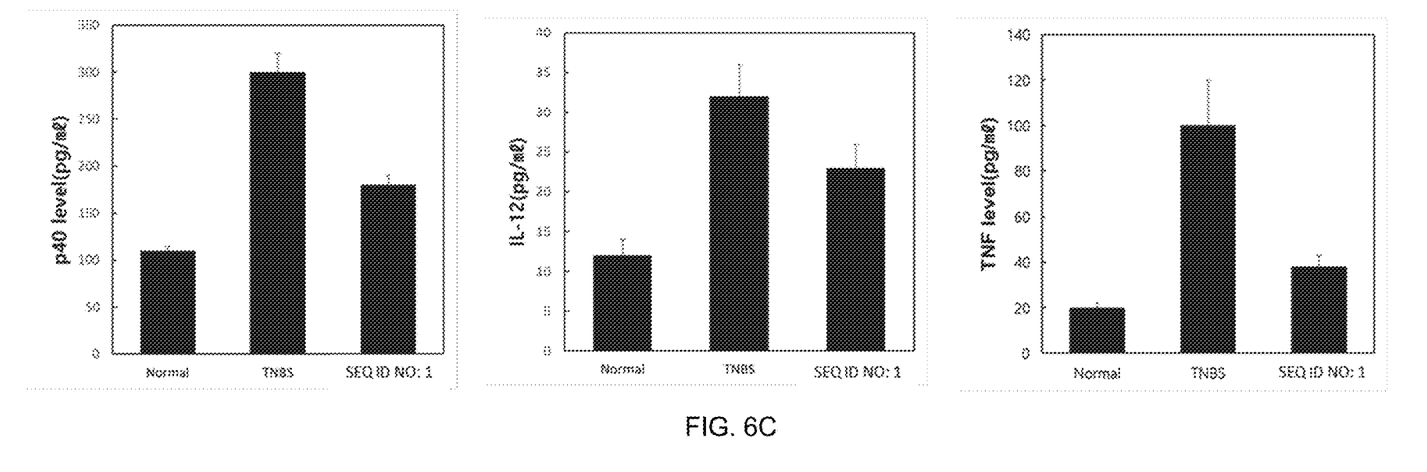
FIG. 6C shows the result of ELISA for detecting the expression of each of p40, TNF-α, and IL-12 upon the administration of SEQ ID NO: 1 to the colitis-induced animal model.

The result showed that expression of p40, TNF-α, and IL-12 increased in the group treated with TNBS, but that expression of p40, TNF-α, and IL-12 decreased in the group injected with the peptide of SEQ ID NO: 1, similar to the normal group (FIG. 6C).

Experimental Example 4: Determination of Effect of Synthetic Peptide on Reduction of Expression of Liver Disease Markers, GDF15 and ATF3 Proteins Western blot was performed to determine the effects of the peptides of SEQ ID NOS: 1 to 4 on the change in the expression of the GDF15 and ATF3 proteins. HepG2 cells were plated at a density of 70% on a 6-well plate. 16 hours later, the cells were starved with DMEM medium containing 0.5% FBS for 2 hours. The cells were treated with a medium containing each of the peptides of SEQ ID NOS: 1 to 4 at a concentration of 200 µM for 2 hours, and were then treated with palmitic acid at a concentration of 200 µM to induce an inflammatory response for 24 hours. Cells were lysed using RIPA lysis buffer (25 mM Tris·HCl pH 7.6, 150 mM NaCl, 1% NP-40, 1% sodium deoxycholate, 0.1% SDS) containing a protease inhibitor and a phosphatase inhibitor. Proteins were quantified through BCA protein assay, and expression levels of GDF15, ATF3, FAS and tubulin proteins were detected by western blot. Western blot was conducted by loading an equal amount of each sample along with a size marker on an 8% SDS PAGE gel, followed by electrophoresis for about 2 hours and transfer to a nitrocellulose membrane. The membrane to which transfer was performed was blocked with 5% skim milk for 1 hour and reacted with the primary antibody at a ratio of 1:1000 overnight. Then, the membrane was washed with TBST containing 0.1% tween-20 and reacted with a secondary antibody to which HRP was adhered for 1 hour, after which chemiluminescence was detected with an ECL substrate.

Figure 7:
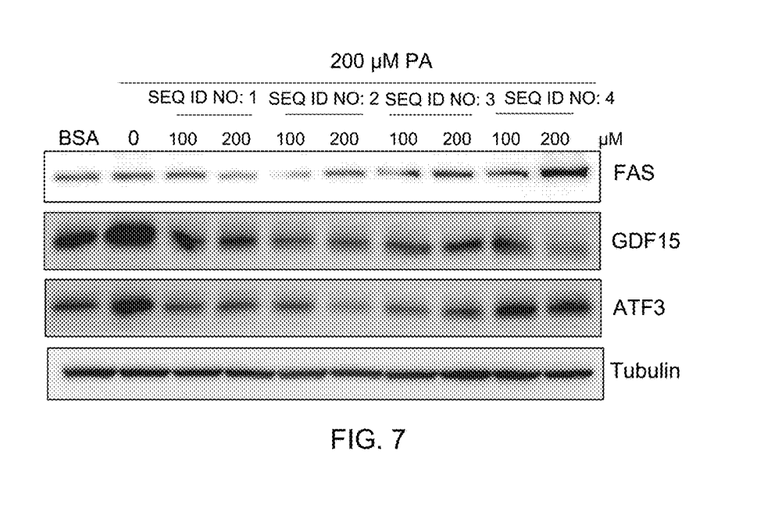
FIG. 7 shows a result of Western blot for detecting the change in the expression levels of GDF15 and ATF3 proteins, which are liver disease markers, upon treatment with the peptides of SEQ ID NOS: 1 to 4.

As a result, when treated with palmitic acid alone, the expression of GDF15 and ATF3 proteins, which are liver disease markers, was increased, but when treated with a combination of the palmitic acid and the peptides of SEQ ID NOS: 1 to 4, the expression of the GDF15 and ATF3 proteins was found to decrease. This indicates that the peptides of SEQ ID NOS: 1 to 4 have an effect of inhibiting the expression of GDF15 and ATF3 proteins, which are liver disease markers, and that the peptides of SEQ ID NOS: 1 to 4 have an effect of treating liver diseases caused by palmitic acid (FIG. 7).

Experimental Example 5: Determination of Effects of Synthetic Peptide on Hepatitis Treatment and Obesity Inhibition In order to determine whether or not the peptide according to the present invention has the effect of treating hepatitis and inhibiting obesity in vivo, a non-alcoholic hepatitis animal model induced by a high-fat diet was used. Male C57BL/6 mice (7 weeks old) were acclimated for 1 week and a total of 20 animals were divided into four experimental groups (n=5 per group), namely, a normal diet group (control), a high-fat diet group (DIO: HFD-induced obesity), a group injected with a low dose of the peptide of SEQ ID NO: 1 (LD SEQ ID NO: 1, 15 mg/kg) and a group injected with a high dose of the peptide of SEQ ID NO: 1 (HD SEQ ID NO: 1, 30 mg/kg), and were reared with the high-fat diet or the normal diet for 7 weeks. The high-fat diet was a 60% high-fat diet (Dyets, Inc). During 7 weeks of rearing, body weight and feed intake were measured twice a week. On the $50^{th}$ day after 7 weeks of rearing, the animals were sacrificed, and liver and adipose tissues were collected and sized.

Figure 8:
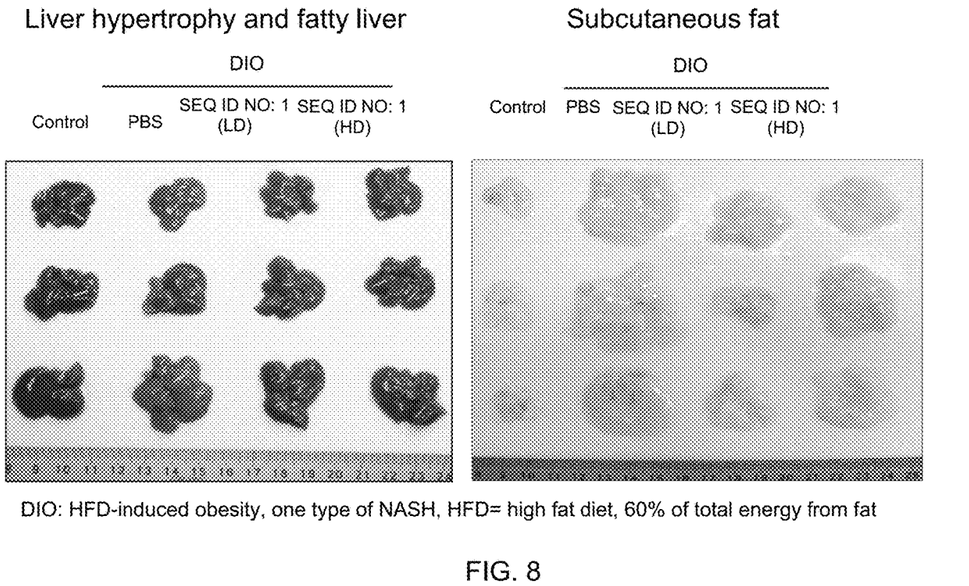
FIG. 8 is an image showing the effect of reducing liver hypertrophy and subcutaneous fat upon administration of SEQ ID NO: 1 to a fatty liver-induced animal model.

As a result, the size of the liver and subcutaneous fat tissue in the high-fat diet group increased significantly compared to the normal diet group, but the size of the liver and subcutaneous fat, which had been increased by the high-fat diet, decreased in the experimental group injected with the peptide of SEQ ID NO: 1 (FIG. 8).

The result proved that the peptide of SEQ ID NO: 1 exerts an effect of treating liver hypertrophy and fatty liver, and also has an effect of suppressing obesity by reducing the increase in subcutaneous fat.

Figure 9A:
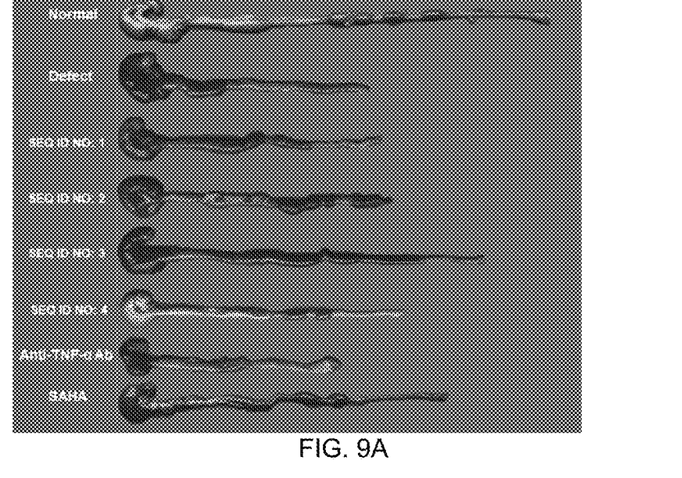
FIG. 9A shows the change in the length of the large intestine 10 days after administration of SEQ ID NOS: 1 to 4 to a DSS-induced inflammatory bowel disease animal model.

Experimental Example 6: Determination of Therapeutic Effect in DSS-Induced Inflammatory Bowel Disease Animal Model by Synthetic Peptide In order to determine the animal-level therapeutic effect of the synthetic peptide, the peptide was injected into ICR mice while inflammatory bowel disease was induced in the ICR mice. Inflammation was induced in mice using 5% DSS as drinking water for 10 days, and at the same time, the synthetic peptide was subjected to IP injection. Each of normal, defective, positive control (SAHA), immunomodulatory control (anti-TNF-a antibody) and SEQ ID NOS: 1-4 peptides treatment was conducted. After 10 days, the mice were sacrificed by $CO_2$ hyperventilation, the colon was collected, and then the length thereof was compared (FIG. 9A). Whether or not intestinal villi were damaged was determined through tissue fixing and treatment, paraffin production and H&E staining.

Figure 9B:
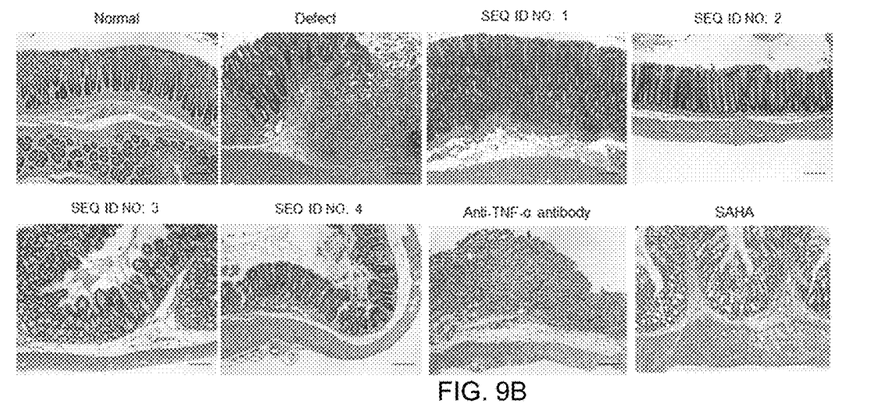
FIG. 9B shows a result of H&E staining for observing the large intestine villi 10 days after administration of SEQ ID NOS: 1 to 4 to the DSS-induced inflammatory bowel disease animal model.

The results showed that more inflammatory cells were observed and that villi were severely damaged in the group induced with inflammation using DSS. However, in the group treated with the peptide of SEQ ID NO: 1 to 4, inflammatory cells and villi damage were reduced, comparable to the normal group (FIG. 9B).

Experimental Example 7: Determination of Therapeutic Effect for Non-Alcoholic Steatohepatitis in MCD Diet Mouse Model by Synthetic Peptide A methionine/choline-deficient (MCD) diet mouse model was used to determine whether or not the peptide is effective in treating steatohepatitis at the animal level according to the present invention. Male C57BL/6J mice were used, and the mice were freely fed a methionine/choline-deficient (MCD) diet for 8 weeks to induce non-alcoholic steatohepatitis. After induction, the peptides of SEQ ID NOS: 1 to 6 were subcutaneously administered thereto once every three days a total of 12 times. For all animals, body weight was measured twice weekly. After the completion of the administration, blood was collected from the mice through the postcaval vein under respiratory anesthesia with isoflurane, and then the mice were subjected to euthanasia by bloodletting. After animal autopsy, the liver was collected and was fixed in a neutral buffered formalin solution. Paraffin blocks were produced, fat accumulated in the liver tissue was detected through H&E staining, the degree of fibrosis was detected, and the NAS score was evaluated.

Figure 10A:
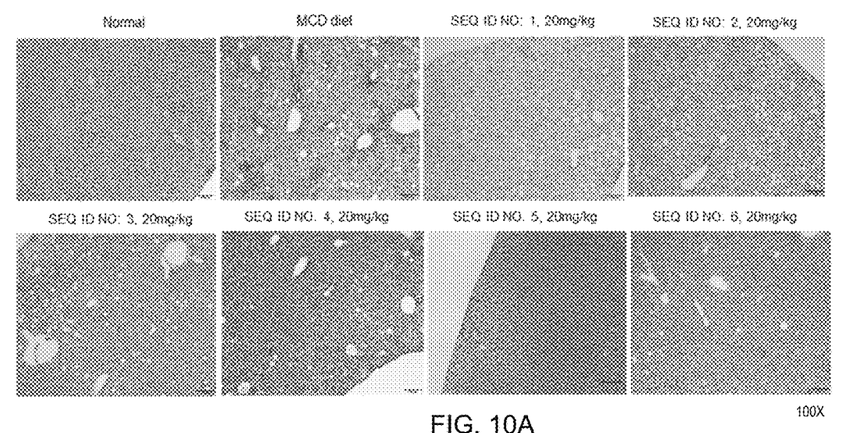
FIG. 10A shows a result of H&E staining for observing the effect of reducing inflammation and fat in liver tissue upon administration of SEQ ID NOS: 1 to 6 to a non-alcoholic steatohepatitis animal model.
Figure 10B:
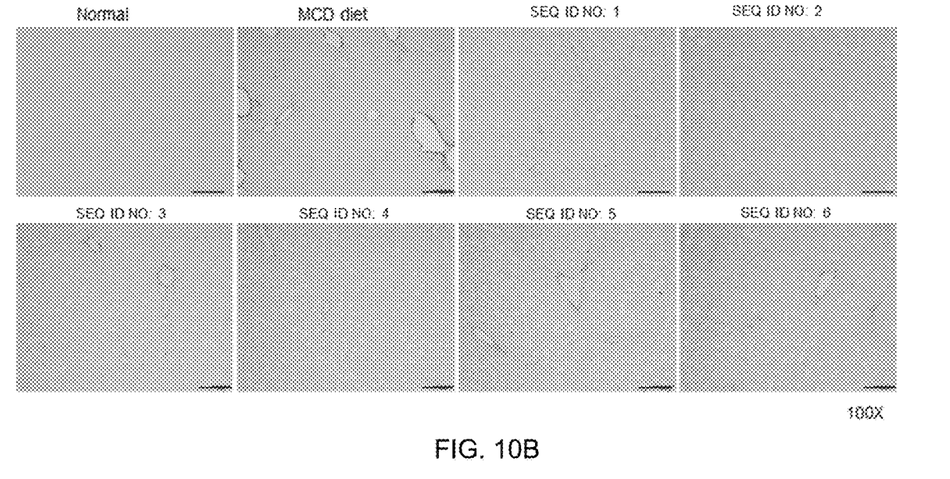
FIG. 10B shows a result of Sirius red staining for observing the effect of reducing fibrosis in liver tissue upon administration of SEQ ID NOS: 1 to 6 to the non-alcoholic steatohepatitis animal model.
Figure 10C:
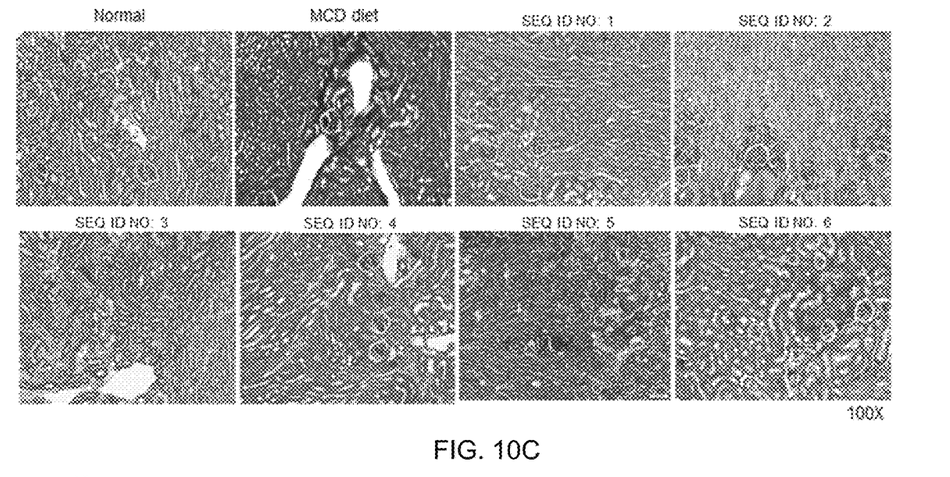
FIG. 10C shows a result of Masson trichrome staining for observing the effect of reducing fibrosis in liver tissue upon administration of SEQ ID NOS: 1 to 6 to the non-alcoholic steatohepatitis animal model.

As a result, as can be seen from FIG. 10A, the number and size of inflammation and fat particles increased in the MCD-diet-induced group, whereas the number and size of inflammation and fat particles decreased in the group injected with the peptide. As can be seen from FIGS. 10B and 10C, fibrosis was very severe in the MCD-diet-induced group (red in FIG. 10B and blue in FIG. 10C), and fibrosis was significantly reduced in the group injected with the peptide.

Figure 10D:
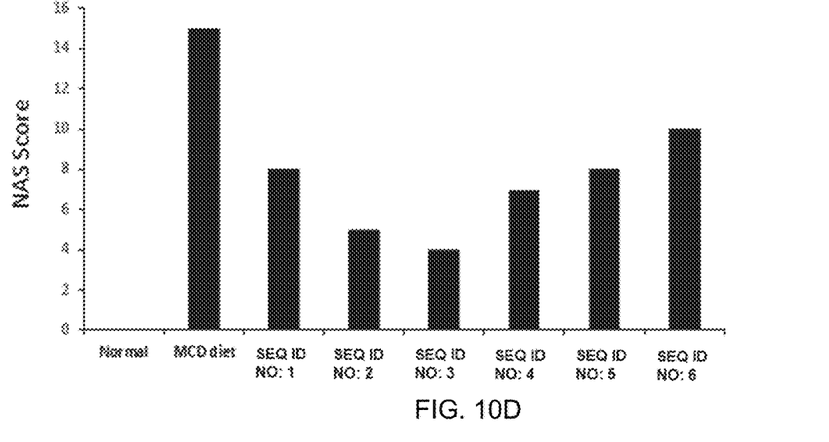
FIG. 10D shows NAS scores for each group upon administration of SEQ ID NOS: 1 to 6 to the non-alcoholic steatohepatitis animal model.

The NAS score is an index of the sum of ballooning degeneration, lobular inflammation and steatosis. The NAS score was reduced by 50% or more in the peptide-treated group, indicating that non-alcoholic fatty liver was ameliorated (FIG. 10D).

Although specific configurations of the present invention have been described in detail, those skilled in the art will appreciate that this description is provided to set forth preferred embodiments for illustrative purposes and should not be construed as limiting the scope of the present invention. Therefore, the substantial scope of the present invention is defined by the accompanying claims and equivalents thereto.

INDUSTRIAL APPLICABILITY

The peptides according to the present invention enable triple-blocking of biomarkers associated with inflammatory and metabolic diseases by inhibiting the phosphorylation of histone deacetylase (HDAC), inhibiting the expression of GDF15 protein, inhibiting the expression of ATF3 protein, and the like, and thus reduce the production of inflammatory cytokines and are effective in preventing and treating metabolic diseases.

The invention claimed is:

1. A method for treating inflammatory disease, liver disease or obesity comprising administering a peptide consisting of an amino acid sequence selected from the group consisting of SEQ ID NO: 5 to SEQ ID NO: 8 to a subject in need thereof, wherein the inflammatory disease is selected from the group consisting of arthritis, inflammatory colitis and Crohn's disease; and
   wherein the liver disease is selected from the group consisting of hepatitis, fatty liver, cirrhosis and liver hypertrophy.

2. The method according to claim 1, wherein the inflammatory disease, liver disease or obesity is caused by hyperphosphorylation of HDAC5 protein, overexpression of GDF15 protein and/or overexpression of ATF3 protein.

3. The method according to claim 1, wherein the peptide inhibits the phosphorylation of HDAC5 protein, the expression of GDF15 protein and/or the expression of ATF3 protein.

4. The method according to claim 1, wherein the hepatitis is non-alcoholic steatohepatitis caused by diabetes and/or obesity.

5. The method according to claim 1, wherein the peptide is prepared in any one formulation selected from the group consisting of injections, formulations for oral administration, patches, solutions, capsules, granules, tablets, powders, sprays, ointments, gels, mucosal formulations and suppositories.

6. The method according to claim 5, wherein the formulation further comprises a pharmaceutically acceptable adjuvant.

7. The method according to claim 6, wherein the pharmaceutically acceptable adjuvant comprises at least one selected from the group consisting of excipients, diluents, buffers, antimicrobial preservatives, surfactants, antioxidants, thickeners and viscosity modifiers.

8. The method according to claim 1, wherein a daily dose of the peptide to be administered is 1 to 100 mg per 1 kg of body weight of the subject and the peptide is administered once a day or 2 to 3 times a week.

* * * * *

```
                           SEQUENCE LISTING

Sequence total quantity: 8
SEQ ID NO: 1            moltype = AA  length = 15
FEATURE                 Location/Qualifiers
source                  1..15
                        mol_type = protein
                        organism = synthetic construct
SEQUENCE: 1
GKCSTRGRKC CRRKK                                                          15

SEQ ID NO: 2            moltype = AA  length = 15
FEATURE                 Location/Qualifiers
source                  1..15
                        mol_type = protein
                        organism = synthetic construct
SEQUENCE: 2
GKCSTRGRKC MRRKK                                                          15

SEQ ID NO: 3            moltype = AA  length = 15
FEATURE                 Location/Qualifiers
source                  1..15
                        mol_type = protein
                        organism = synthetic construct
SEQUENCE: 3
GKCSTRGRKM CRRKK                                                          15

SEQ ID NO: 4            moltype = AA  length = 15
FEATURE                 Location/Qualifiers
source                  1..15
                        mol_type = protein
                        organism = synthetic construct
SEQUENCE: 4
GKCSTRGRKM MRRKK                                                          15

SEQ ID NO: 5            moltype = AA  length = 15
FEATURE                 Location/Qualifiers
source                  1..15
                        mol_type = protein
                        organism = synthetic construct
SEQUENCE: 5
GKMSTRGRKC CRRKK                                                          15

SEQ ID NO: 6            moltype = AA  length = 15
FEATURE                 Location/Qualifiers
source                  1..15
                        mol_type = protein
                        organism = synthetic construct
SEQUENCE: 6
GKMSTRGRKM CRRKK                                                          15

SEQ ID NO: 7            moltype = AA  length = 15
FEATURE                 Location/Qualifiers
source                  1..15
```

```
                        mol_type = protein
                        organism = synthetic construct
SEQUENCE: 7
GKMSTRGRKC MRRKK                                                    15

SEQ ID NO: 8            moltype = AA  length = 15
FEATURE                 Location/Qualifiers
source                  1..15
                        mol_type = protein
                        organism = synthetic construct
SEQUENCE: 8
GKMSTRGRKM MRRKK                                                    15
```